No. 848,172. PATENTED MAR. 26, 1907.
R. R. HOWELL.
WIND STACKER.
APPLICATION FILED MAY 31, 1904.

2 SHEETS—SHEET 1.

WITNESSES
Q. G. Hanson.
M. Hagerty

INVENTOR
ROBERT R. HOWELL
BY
Paul & Paul
HIS ATTORNEYS.

No. 848,172.

PATENTED MAR. 26, 1907.

R. R. HOWELL.
WIND STACKER.
APPLICATION FILED MAY 31, 1904.

2 SHEETS—SHEET 2.

WITNESSES
O. G. Hanson.
M. Hagerty

INVENTOR
ROBERT R. HOWELL
BY
Paul & Paul
HIS ATTORNEYS.

UNITED STATES PATENT OFFICE.

ROBERT R. HOWELL, OF MINNEAPOLIS, MINNESOTA.

WIND-STACKER.

No. 848,172.     Specification of Letters Patent.     Patented March 26, 1907.

Application filed May 31, 1904. Serial No. 210,374.

*To all whom it may concern:*

Be it known that I, ROBERT R. HOWELL, of Minneapolis, Hennepin county, Minnesota, have invented certain new and useful Improvements in Wind-Stackers, of which the following is a specification.

In the construction of a wind-stacker it is customary to arrange the fan or fans in a vertical plane, and where fans of large diameter are employed it is difficult to locate them on the separator, so that the entrance to the stacker-tube will be near enough to the straw-rack and sieves to permit the convenient delivery of the chaff and straw. Furthermore, I have found that where large fans are employed in vertical planes that it is difficult to locate them so that the opening leading to the stacker-tube will be on the desired level.

The object, therefore, of my invention is to provide a wind-stacker apparatus that is capable of being arranged near the straw-rack and sieves and on a level that will allow the convenient and rapid delivery of the chaff and straw thereto.

A further object is to provide a wind-stacker apparatus which will direct the chaff and other material toward the center of the discharge-throat and blast-tube, and thereby facilitate the delivery of the material from the machine and prevent all danger of clogging.

The invention consists generally in various constructions and combinations, all as hereinafter described, and particularly pointed out in the claims.

Figure 1:
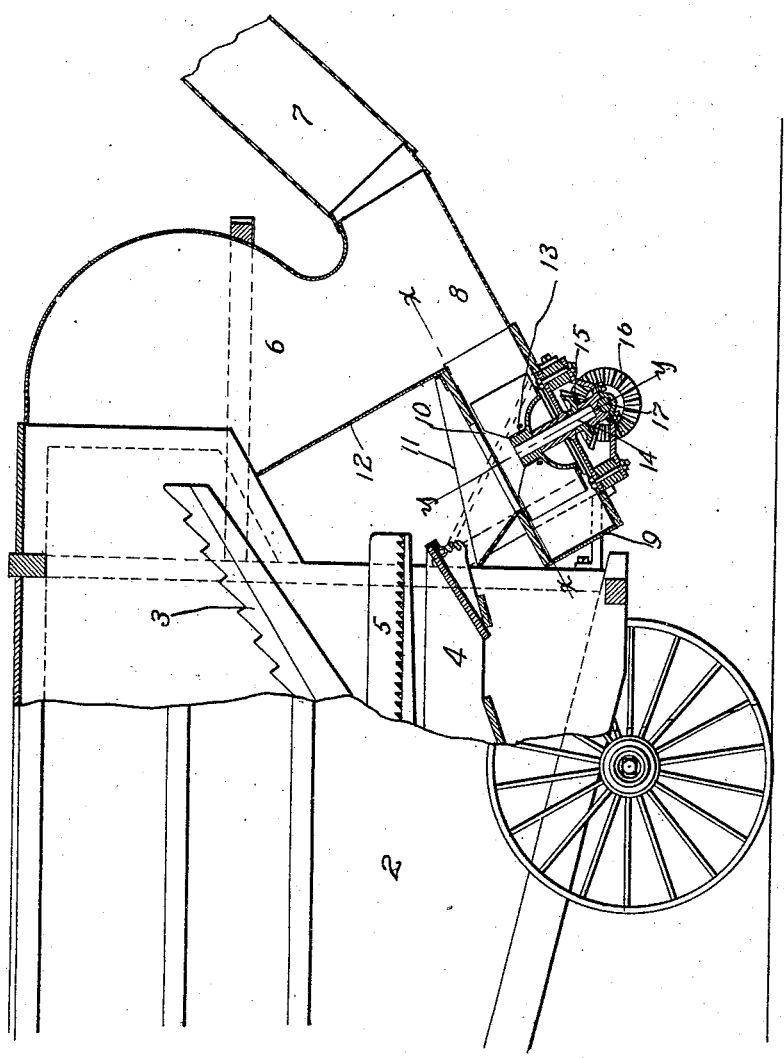
Figure 2:
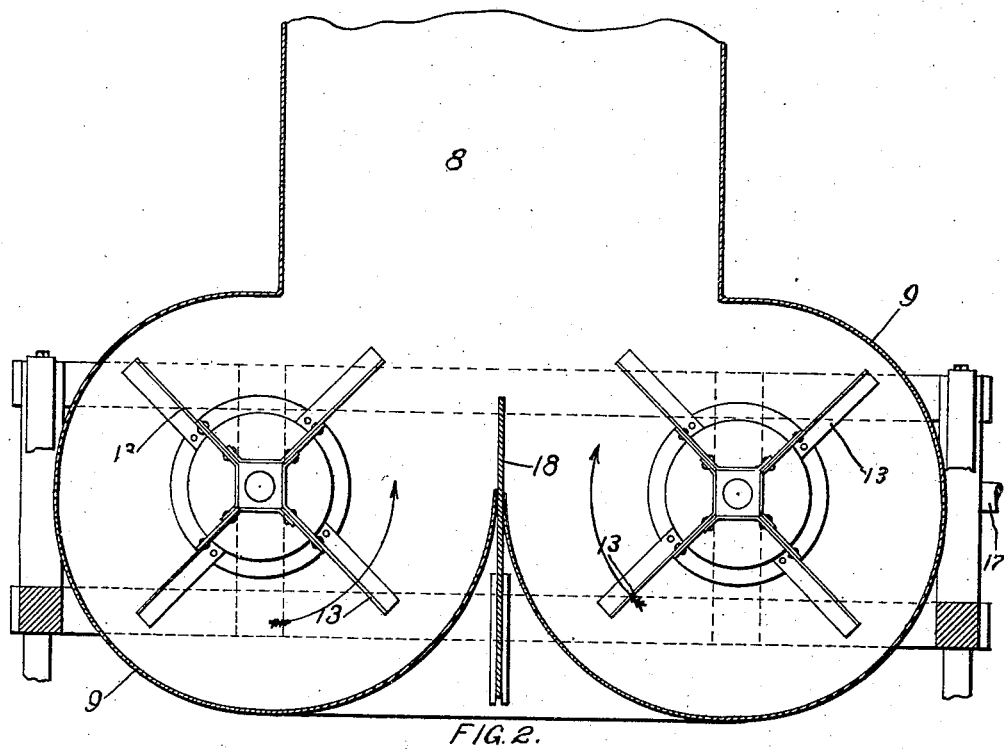
Figure 3:
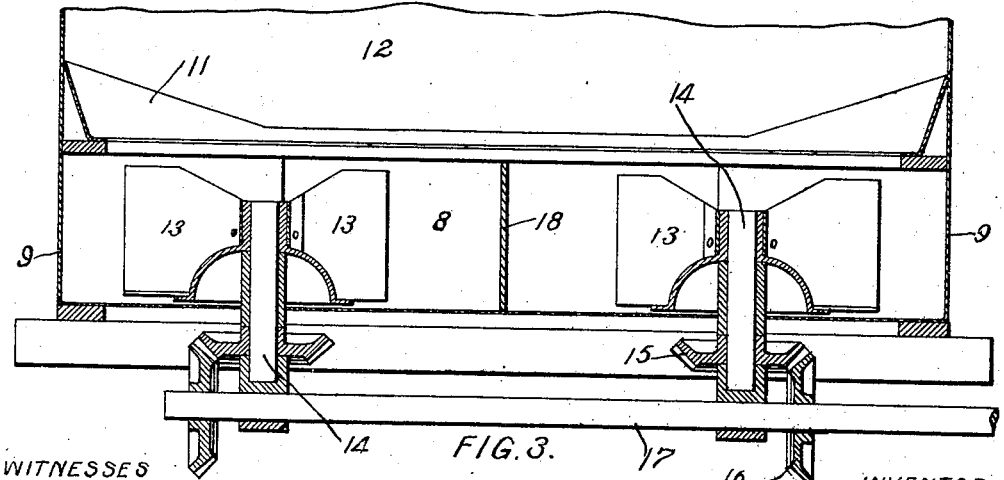

In the accompanying drawings, forming part of this specification, Figure 1 is a side elevation, partly in section, of the end of a separator with my invention applied thereto. Fig. 2 is a section on the line *x x* of Fig. 1. Fig. 3 is a section on the line *y y* of Fig. 1.

In the drawing, 2 represents a separator of ordinary type, having a straw-rack 3 and a shoe 4, between which and the rack is a shaker 5. A trunk 6 is provided on the end of the separator in position to receive the straw from the rack 3, and a stacker-tube 7 is connected to said trunk. Opposite the opening leading to the stacker-tube is a throat or passage 8, communicating with a fan-casing 9, having a hopper-opening 10 beneath the discharge ends of the shoe 4 and the shaker 5. An inclined wall 11 is preferably provided around the said opening to direct the material therein, and said opening is separated from the trunk 6 by a wall 12.

Within the casing 9 I arrange two blast-fans 13, having shafts 14, provided with gears 15, driven from similar gears 16 on a shaft 17. The gears are so arranged that the fans are revolved toward each other and tend to direct the blast toward the center of the throat 8 and discharge the chaff directly into the opening of the stacker-tube. By providing a pair of fans arranged side by side and operating in a substantially horizontal instead of a vertical plane I am able to bring the chaff-opening and the receiving end of the stacker-tube nearer the straw-rack and shoe and at the same time provide a blast of sufficient strength to prevent choking and clogging of the straw and chaff in the air-trunk. A slide 18 is provided midway of the casing 9, by means of which the operator can regulate the direction of the blast through the throat 8. By drawing out the slide the blasts will be allowed to mingle and by pushing in the slide they will be separated and the opening into the throat divided.

The opening into the fan-casing extends entirely across the end of the separator and allows the chaff to be fed rapidly to the fans the full width of the shaker and shoe without danger of clogging.

An important feature of my invention consists in placing the fans side by side in one casing upon substantially the same level and revolving them toward one another beneath the hopper-opening and in the rear of a centrally-arranged discharge throat or passage that is common to both fans. By this arrangement I am able to deliver the chaff to the fans and direct it toward the middle of the discharge-throat and stacker-tube and prevent the material from striking the sides of the casing and throat and obviating all danger of the material clogging therein.

I claim as my invention—

1. In a separator, the combination, with a straw-rack, of a trunk arranged to receive straw therefrom, a stacker-tube communicating with said trunk, a fan-casing having a hopper-feed opening and a discharge throat or passage leading into said trunk opposite the opening in said stacker-tube, blast-fans provided on the same level in said casing and revolving toward each other, and an adjustable slide interposed between said fans in said casing.

2. In a separator, the combination, with a straw-rack 3 and shaker 5 located beneath said rack, of a trunk 6 arranged to receive the straw from said rack, a stacker-tube communicating with said trunk 6, a fan-casing having a discharge throat or passage leading into said trunk 6 opposite the opening to said stacker-tube, said fan-casing being substantially horizontal and having an opening in its top beneath the discharge end of said shaker to receive the chaff therefrom, and blast-fans operating side by side in said casing and revolving toward each other to direct the chaff through said throat or passage and into said stacker-tube, substantially as described.

3. The combination, with a fan-casing having a discharge throat or passage, of a stacker-tube communicating with said throat, fans arranged in said casing side by side revolving toward each other to direct the material toward the center of said throat and tube, and means for delivering the straw into the path of the air-blast between said throat and tube and means for delivering the chaff to said fan-casing whereby it will be passed through the fans and be discharged thereby through said throat or passage and mingled with the straw in said tube, substantially as described.

4. In a separator, the combination, with a straw-rack and a shaker located beneath the same, of a trunk arranged to receive the straw from said rack, a stacker-tube communicating with the lower portion of said trunk, a fan-casing arranged in a substantially horizontal plane and having a throat or passage leading into said trunk opposite the passage to said stacker-tube, and said casing having also a hopper-opening in its top extending transversely thereof the full width of said shaker and in position to receive the chaff from said shaker, blast-fans arranged in said casing and revolving toward each other to discharge the chaff delivered thereto centrally with respect to said throat or passage, substantially as described.

In witness whereof I have hereunto set my hand this 12th day of May, 1904.

ROBERT R. HOWELL.

In presence of—
RICHARD PAUL,
M. HAGERTY.